(12) United States Patent
Pine

(10) Patent No.: US 10,118,556 B2
(45) Date of Patent: Nov. 6, 2018

(54) FOLDING STEP LADDER

(71) Applicant: Douglas Pine, Tok, AK (US)

(72) Inventor: Douglas Pine, Tok, AK (US)

(*) Notice: Subject to any disclaimer, the term of this patent is extended or adjusted under 35 U.S.C. 154(b) by 0 days.

(21) Appl. No.: 15/216,491

(22) Filed: Jul. 21, 2016

(65) Prior Publication Data

US 2017/0021772 A1  Jan. 26, 2017

Related U.S. Application Data

(60) Provisional application No. 62/195,017, filed on Jul. 21, 2015.

(51) Int. Cl.
| | | |
|---|---|---|
| *B60R 3/00* | (2006.01) |
| *E06C 5/02* | (2006.01) |
| *E06C 1/39* | (2006.01) |
| *E06C 1/393* | (2006.01) |
| *E06C 7/18* | (2006.01) |

(52) U.S. Cl.
CPC ............... *B60R 3/007* (2013.01); *E06C 5/02* (2013.01); *E06C 1/39* (2013.01); *E06C 1/393* (2013.01); *E06C 7/182* (2013.01)

(58) Field of Classification Search
CPC . E06C 7/02; E06C 1/393; E06C 31/39; B60R 3/007
See application file for complete search history.

(56) References Cited

U.S. PATENT DOCUMENTS

| | | | | |
|---|---|---|---|---|
| 620,248 | A * | 2/1899 | Owens | A47L 3/02 182/57 |
| 656,626 | A * | 8/1900 | Campblell | A47L 3/02 182/57 |
| 952,948 | A * | 3/1910 | Ryder | E06C 1/39 182/129 |
| 1,601,471 | A * | 9/1926 | Fowler | A47L 3/02 182/62 |
| 2,378,678 | A | 6/1945 | Anderson | |
| 2,925,139 | A * | 2/1960 | Salas | E04G 3/18 182/113 |
| 6,857,680 | B2 * | 2/2005 | Fielding | B60N 2/3015 280/166 |
| 6,957,719 | B2 | 10/2005 | Ehnes | |
| D573,929 | S | 7/2008 | Black | |

(Continued)

Primary Examiner — Alvin C Chin-Shue
(74) Attorney, Agent, or Firm — Global Intellectual Property Agency, LLC; Daniel Boudwin

(57) ABSTRACT

A folding step ladder is provided. The folding step ladder includes a platform that can be positioned atop a vehicle's wheels and support a user. The platform is connected to a pair of spaced apart parallel rails via a hinge and the rails are connected to each other by one or more rungs that span therebetween to form a ladder. The platform includes a stabilizing bar that can be positioned between the vehicle and the vehicle's wheels. In one embodiment, the stabilizing bar includes one or more elongated sections in a telescoping arrangement that allows a user to adjust the length of the stabilizing bar. In one embodiment, a second side of the platform includes a high friction surface that prevents slippage when mounted to the vehicle's wheels. The platform and ladder may be moved together at the hinge into a folded configuration as desired.

10 Claims, 5 Drawing Sheets

(56) References Cited

U.S. PATENT DOCUMENTS

| | | | | |
|---|---|---|---|---|
| 8,505,944 B2* | 8/2013 | Genest | ...................... | B60R 3/02 |
| | | | | 280/166 |
| 9,500,029 B1* | 11/2016 | Mullins | .................. | E06C 1/393 |
| 2006/0157301 A1 | 7/2006 | Embretsen | | |
| 2009/0200110 A1* | 8/2009 | Esselborn | ................. | E06C 7/46 |
| | | | | 182/107 |
| 2009/0273202 A1* | 11/2009 | Heaman | ............. | B62D 33/0273 |
| | | | | 296/26.1 |
| 2010/0122871 A1 | 5/2010 | Gottlinger | | |

* cited by examiner

FOLDING STEP LADDER

CROSS REFERENCE TO RELATED APPLICATION

This application claims the benefit of U.S. Provisional Application No. 62/195,017 filed on Jul. 21, 2015. The above identified patent application is herein incorporated by reference in its entirety to provide continuity of disclosure.

BACKGROUND OF THE INVENTION

The present invention relates to a folding step ladder. More specifically, the present invention relates to a folding step ladder mountable to a vehicle's wheels that utilizes a stabilizing rod to secure the ladder to the vehicle's wheels.

Many construction and other large vehicles typically have large wheels in close proximity to each other in a multiple axle arrangement. For these large vehicles, the multiple axle arrangement provides better load distribution of the vehicle on the road surface. However, these vehicles often fail to provide sufficient space for a vehicle operator or mechanic to perform inspections and routine maintenance. For example, a construction vehicle commonly referred to as a grader or road grader, utilizes a pair of rear axles, wherein the wheels are positioned outside the vehicle body. Although a mechanic can stand atop the wheels, climbing atop the wheel can be difficult and the curved wheel does not provide a stable platform to perform vehicle maintenance.

Ladder stability and safety is of paramount importance given that a user is higher off the ground and often occupied completing manual tasks. Some attempts have been made to provide devices that assist with climbing of the vehicle. However, these devices mount to a single wheel and can be easily dislodged therefrom. Further, these devices lack the necessary stability provided by mounting to a single wheel. The single wheel is curved are the mounted device can easily slide off either side of the wheel. The present invention provides a wheel mounting folding step ladder that secures between and atop a pair of wheels. The stability of the present invention is provided by contacting more than one wheel and a stabilizing bar that is positionable between the wheels and the vehicle body.

In light of the devices disclosed in the known art, it is submitted that the present invention substantially diverges in design elements from the known art and consequently it is clear that there is a need in the art for an improvement to folding step ladders. In this regard the instant invention substantially fulfills these needs.

SUMMARY OF THE INVENTION

In view of the foregoing disadvantages inherent in the known types of folding step ladders now present in the known art, the present invention provides a folding step ladder that utilizes a pair of spaced apart parallel rails connected by a plurality of rungs, and a platform pivotally connected to the parallel rails. The platform includes a stabilizing bar at is positionable between the wheels and the vehicle body and configured to support a user thereon.

It is therefore an object of the present invention to provide a new and improved folding step ladder that has all of the advantages of the known art and none of the disadvantages.

The present invention relates to a folding step ladder comprising a pair of spaced apart parallel rails connected by a plurality of rungs, and a platform pivotally connected to the parallel rails. The platform includes a stabilizing bar at is positionable between the wheels and the vehicle body and configured to support a user thereon It is another object of the present invention to provide a folding step ladder that is stable and safe. The platform includes a high friction surface for frictionally engaging the wheels to prevent movement.

It is another object of the present invention to provide a folding step ladder having the platform and parallel rails fold into a folded configuration when not in use for convenient storage.

It is therefore an object of the present invention to provide a folding step ladder with a hand hold member for assisting with climbing and descending of the ladder.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
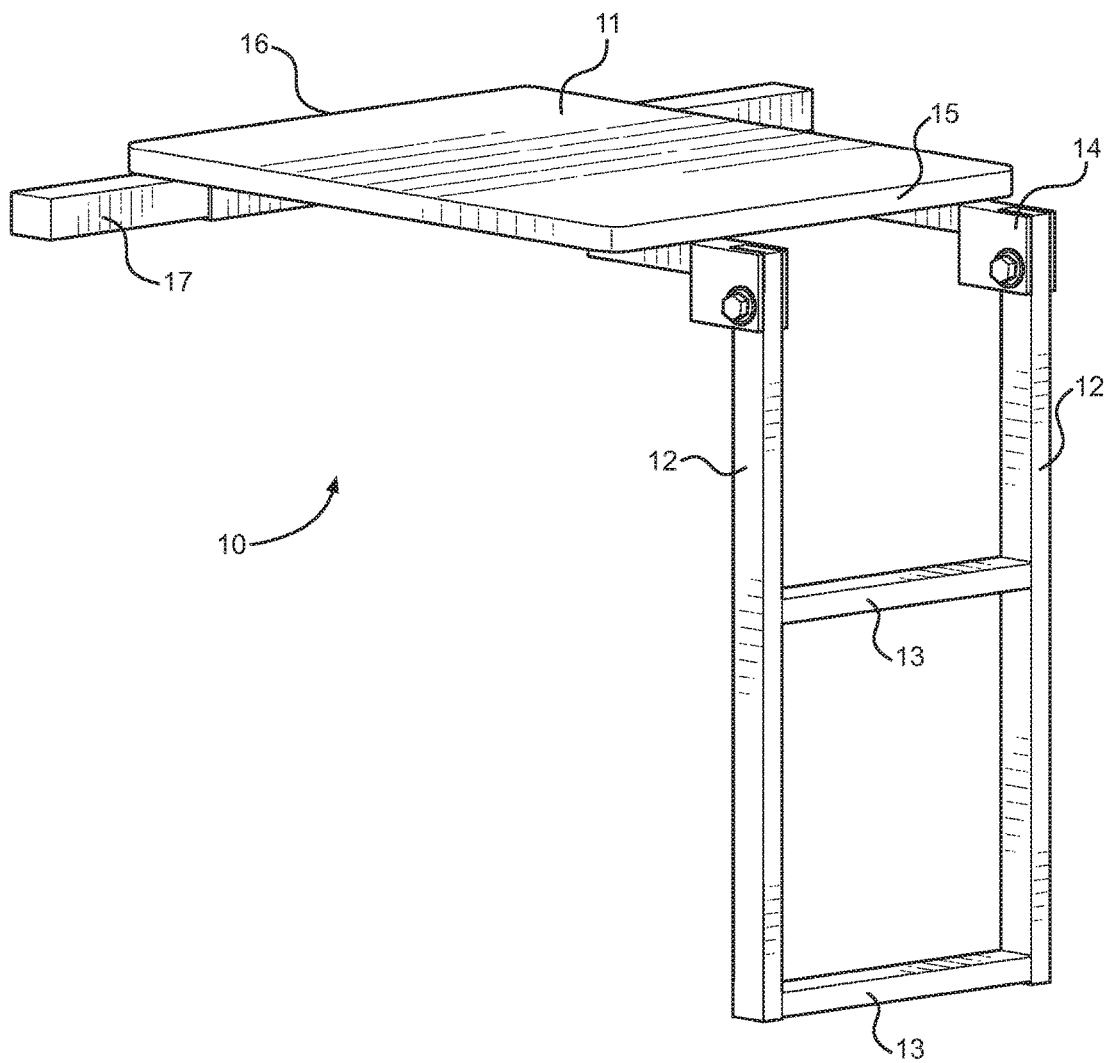
FIG. 1 shows a perspective view of one embodiment of the present invention.

Reference is made herein to the attached drawings. Like reference numerals are used throughout the drawings to depict like or similar elements of the folding step ladder. For the purposes of presenting a brief and clear description of the present invention, the preferred embodiment will be discussed as used for mounting to a vehicle's wheel. The figures are intended for representative purposes only and should not be considered to be limiting in any respect.

Referring now to FIG. 1, there is shown a perspective view of one embodiment of the present invention. The present invention provides a folding step ladder 10 that is mountable to vehicle's wheels to assist a user in ascending and descending the vehicle. The folding step ladder 10 comprises a platform 11 hingedly connected to a pair of spaced apart rails 12, wherein the rails 12 are connected to each other by one or more rungs 13 that span therebetween. In the shown embodiment, the platform 11 further comprise a pair of tubular section that are hingedly connected to a pair of spaced apart parallel rails 12. The tubular sections provide additional structural support of the rails 12. In alternative embodiments, the rails 12 are directly hingedly connected to the platform. The platform 11 is configured to support a user thereon. In the shown embodiment, the platform 11 is planar. However, in alternative embodiments, the platform 11 may have any shape for supporting a user thereon.

In the illustrated embodiment, the platform 11 of the folding step ladder 10 comprises a rectangular cross section, however, in alternate embodiments the platform 11 can comprise any suitable cross section, such as an oval. The platform includes a first end 15 and an opposing second end 16, wherein the rails 12 are affixed to the platform 11 via hinge 14 at the first end 15. The second end 16 comprises a stabilizing bar 17 configured to mount between a vehicle and the vehicle's wheels to provide support and stability. In the shown embodiment, the stabilizing bar 17 extends perpendicularly outward from opposing sides of the second end 16 of the platform 11. The platform 11 and the stabilizing bar 17 are contained in the same horizontal plane. In alternative embodiments, the platform 11 and stabilizing bar 17 may be oriented in different, intersecting planes.

Figure 2:
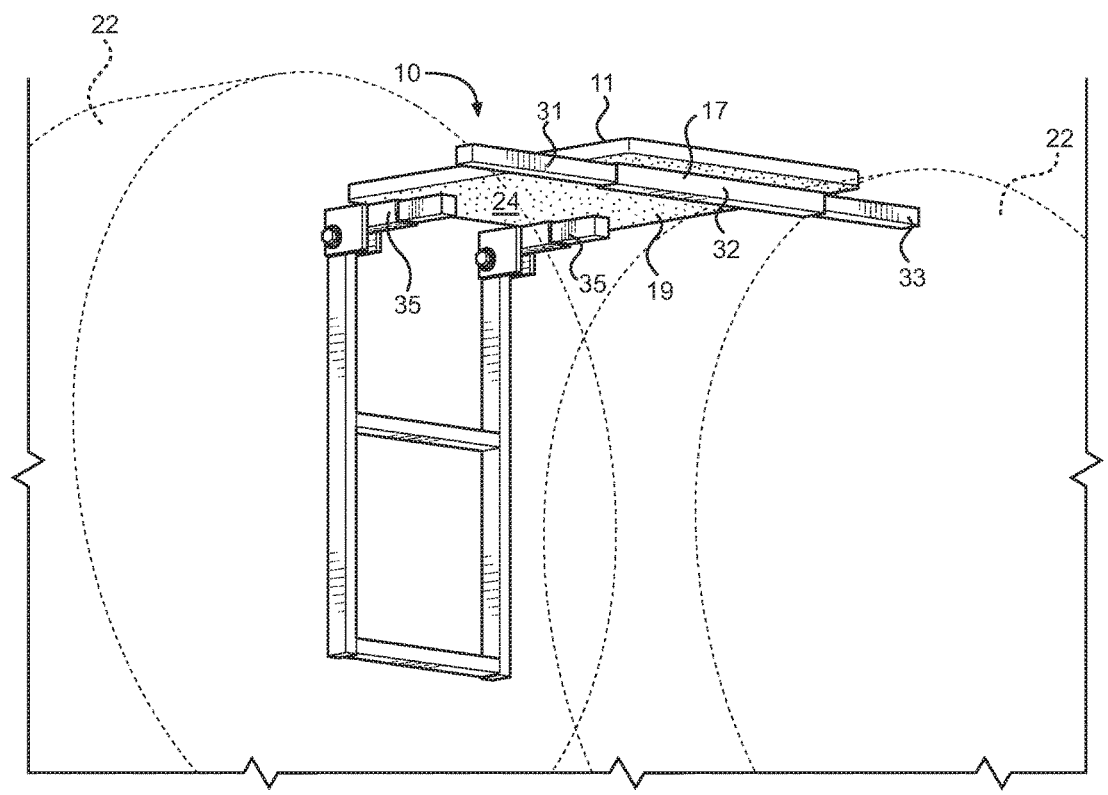
FIG. 2 shows an underside view of one embodiment of the present invention.
Figure 3:
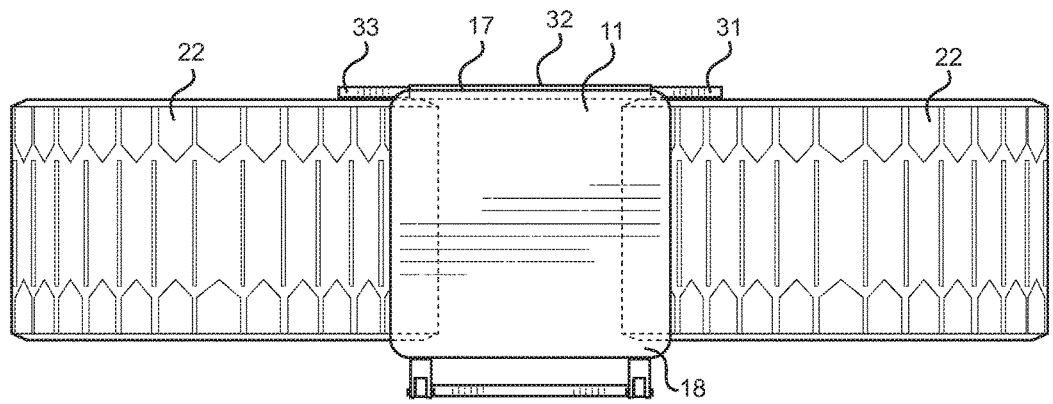
FIG. 3 shows an overhead perspective view of one embodiment of the present invention in one use.

Referring now to FIGS. 2 and 3, there is shown an underside view of one embodiment of the present invention and an overhead view of one embodiment of the present invention, respectfully. In the shown embodiments, the stabilizing bar 17 is adapted for horizontal movement/translation thereof. Further, the stabilizing bar 17 comprises one or more elongated sections 31, 32, 33. In the shown embodiment, a first elongated section 31 and a third elongated section 33 are adjustably secured to a second elongated section 32, wherein the second elongated section 32 is secured to the platform, so as to allow the stabilizing bar 17 to move from an extended position to a retracted position. This telescopic arrangement of the elongated sections 31, 32, 33 provides for adjustment of the linear length of the stabilizing bar 17. The elongated sections 31, 32, 33 are fastened to one another via any suitable fastener, such as a threaded connection.

In the shown embodiment, the elongated sections 31 allows a user to select the desired position of the stabilizing bar 17. In the illustrated embodiment, the elongated sections 31, 32, 33 are tubular members comprising a rectangular cross-section, however in alternative embodiments, the elongated sections 31, 32, 33 may comprise any suitable cross-sectional shape. The telescopic arrangement of the stabilizing bar 17 enables the folding step ladder 10 to mount to vehicle's having various dimensions.

The platform 11 comprises a first side 18 and an opposing second side 19, wherein the second side 19 is configured to rest atop a pair of adjacent wheels 22. In the shown embodiment, the platform 11 is positioned between the wheels 22 and oriented in a horizontal plane. In one embodiment, the second side 19 comprises a high friction surface 24 configured to prevent slippage of the platform 11. In one embodiment, the tubular sections 35 are extendable away from the platform, thereby enabling a user to change the distance between the rails 12 and the platform 11. In this way, the tubular sections 35 allow the folding step ladder 10 to be positioned over wheels 22 of varying dimensions.

Figure 4:
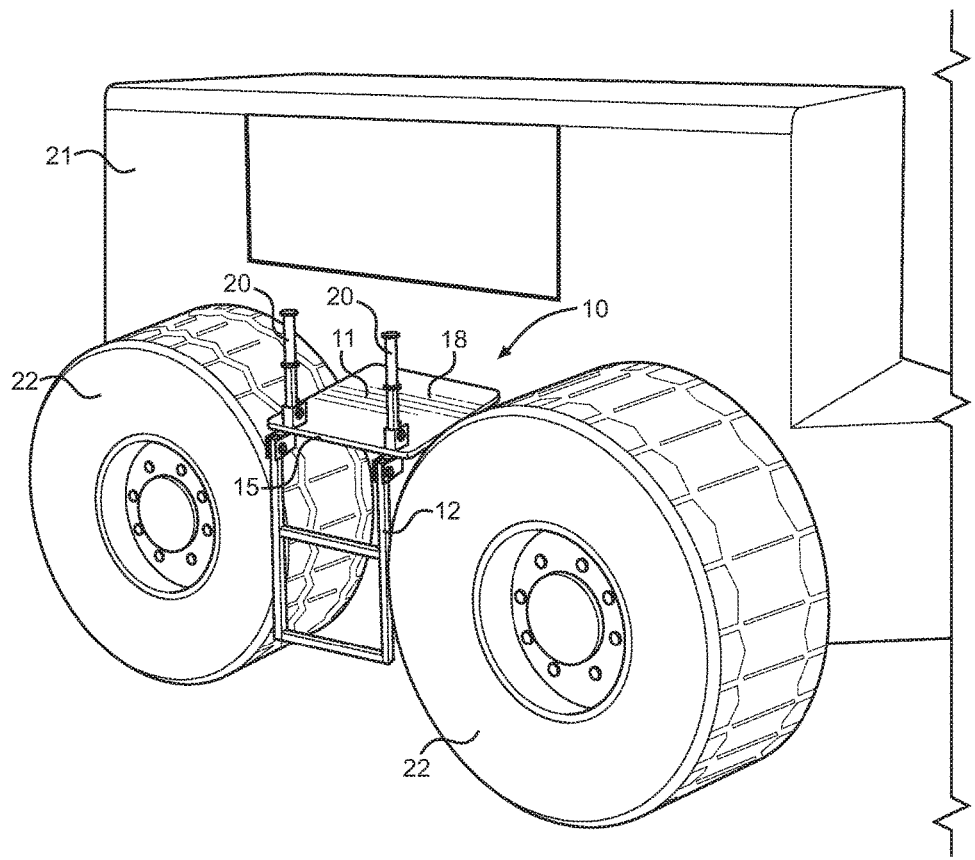
FIG. 4 shows a perspective view of one embodiment of the present invention mounted to a vehicle.
Figure 5:
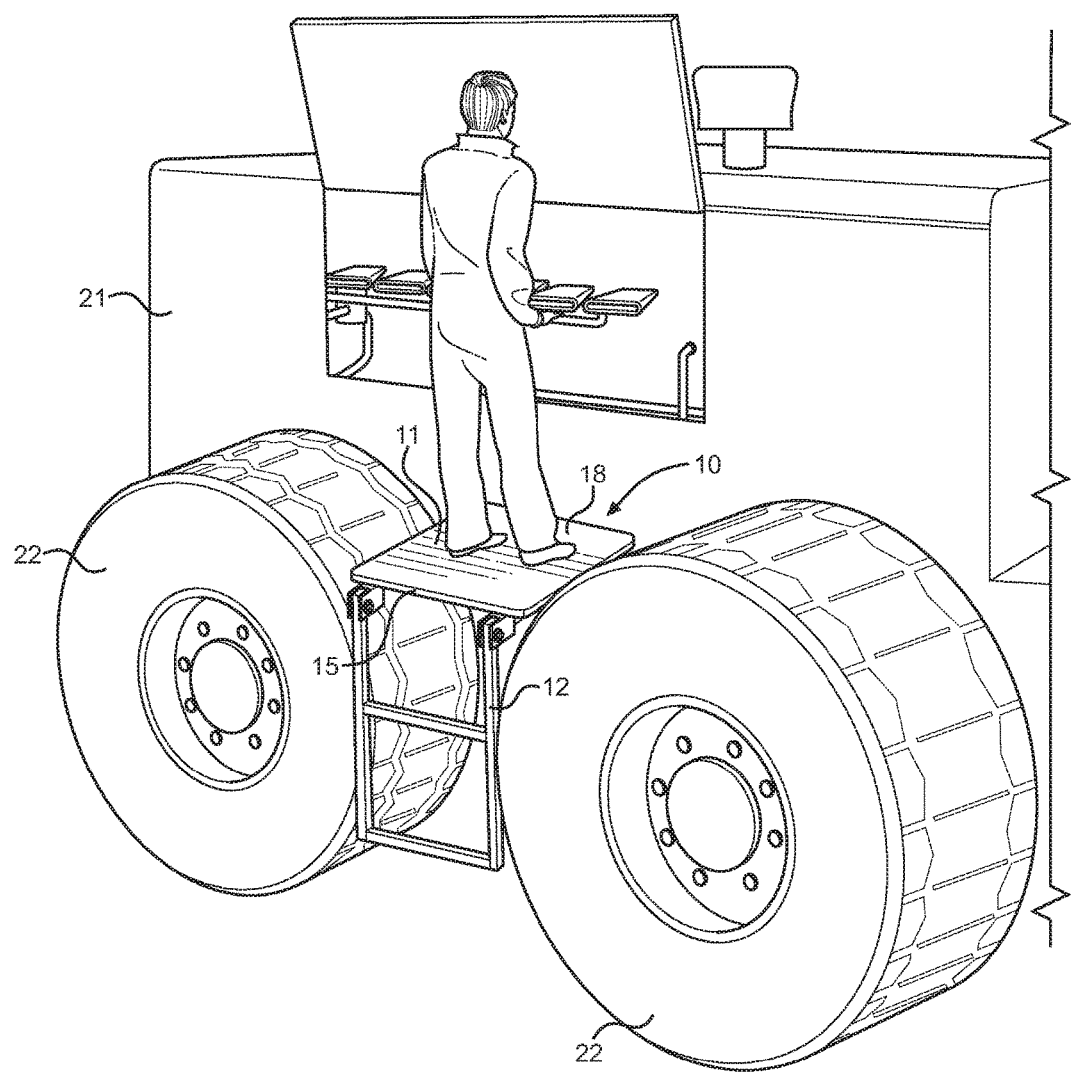
FIG. 5 shows another perspective view of one embodiment of the present invention mounted to a vehicle.

Referring now to FIGS. 4 and 5, there are shown perspective views of one embodiment of the present invention mounted to a vehicle. In operation, the folding step ladder 10 is mounted to a large construction vehicle 21 having a multiple axle arrangement, wherein the multiple axle arrangement includes wheels 22 positioned outside the body of the vehicle 21. The folding step ladder 10 is mounted between the wheels 22 such that the platform 11 rests atop the wheels and the stabilizing bar 17 is positioned between the wheels 22 and the body of the vehicle 21. The stabilizing bar 17 prevents the folding step ladder 10 from rotational movement away from the vehicle 21 and provides stability and support when a user climbs and descends the platform 11. Further, the stabilizing bar 17 and platform 11 prevent slippage of the folding step ladder 10 from the wheels 22.

In one embodiment, the platform 11 further comprises the first side 18 and an opposing second side, wherein the first side 18 comprises a hand hold member 20 that extends upward from the platform 11. The hand hold member 20 provides a gripping surface that assist a user climb and descend from the platform 11. The hand hold member 20 comprises a tubular member disposed on the first end 15 of the platform 11. In the shown embodiment, a pair of hand hold members 20 are pivotally affixed to the first end 15 of the platform 11 and configured to fold approximately flush with the first side 18 of the platform 11. However, in alternative embodiments, the hand hold members 20 may include hooks, curved members, and the like, and may be positioned on the platform 11 anywhere between the first end 15 and the second end 16. In yet another embodiments, the hand hold members 20 may be affixed to the rails 12.

Figure 6:
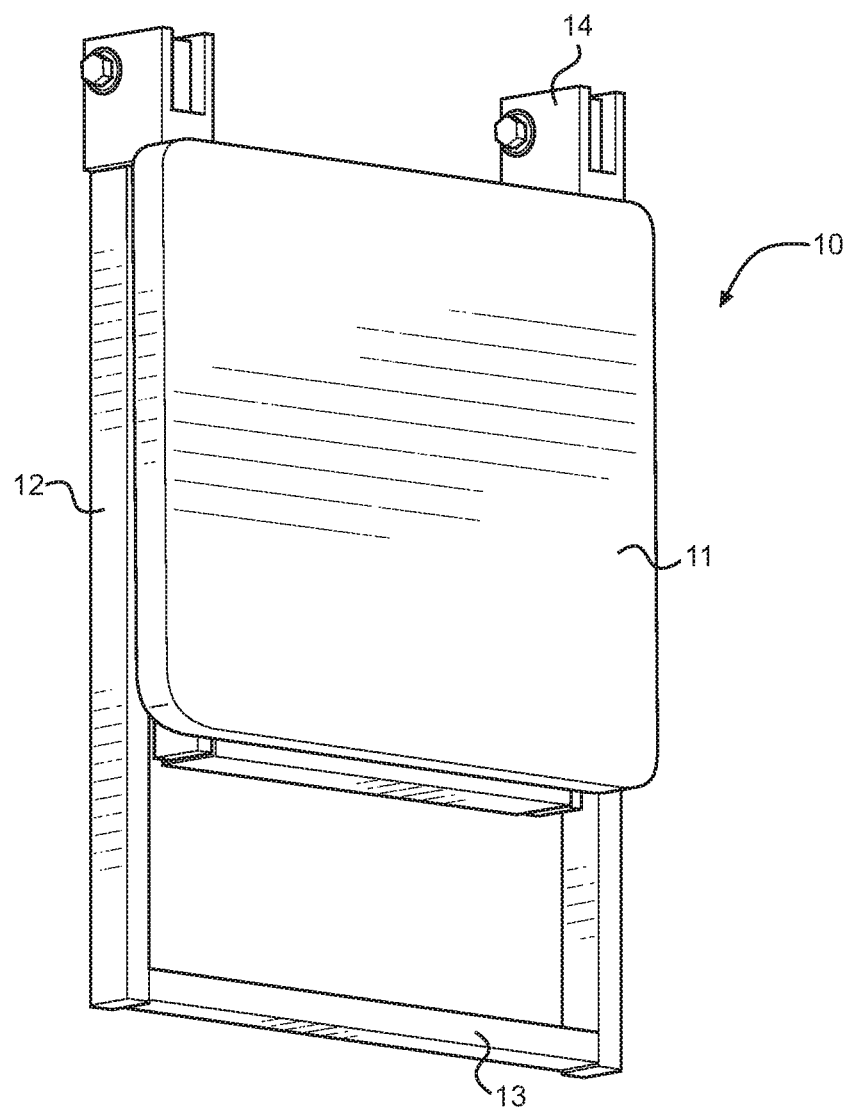
FIG. 6 shows a perspective view of one embodiment of the present invention in a folded configuration.

Referring now to FIG. 6, there is shown a perspective view of one embodiment of the present invention in a folded configuration. The folding step ladder 10 is movable between a working configuration and a folded configuration via the hinge 14. In a working configuration, the rails 12 are at approximately a right angle from the platform 11. In this configuration, the folding step ladder 10 is adapted to be mounted to a vehicle's wheels. In a folded configuration, the rails 12 and rungs 13 are positioned approximately flush with the bottom side (not shown) of the platform 11. In the working configuration, the folding step ladder 10 is adapted to allow a user to easily mount the present invention to a vehicle and climb towards the engine compartment, whereas in the folded configuration the folding step ladder 10 is easy to store and carry It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A folding step ladder comprising:
    a pair of spaced apart rails;
    one or more rungs secured to each of the rails and spanning between the rails;
    a platform having a first end and a second end;
    wherein the first end is pivotally affixed to the pair of rails;
    a stabilizing bar extending perpendicularly outward from opposing sides of the second end of the platform;
    wherein the platform and the stabilizing bar are contained in the same horizontal plane;
    the stabilizing bar comprises a plurality of elongated sections in a telescopic arrangement, the elongated sections configured to adjust the linear length of the stabilizing bar;

the pair of rails move between a folded configuration, such that the pair of rails are disposed flush with the platform, and a working configuration, such that the rails form a ninety-degree angle with the platform;

wherein the working configuration the stabilizing bar is mounted directly to a pair of adjacent tires of a multi-axle vehicle, such that the platform and the pair of spaced apart rails is disposed between the pair of adjacent tires.

2. The folding step ladder of claim 1, wherein:
the platform comprises an upper side and an opposing lower side;
wherein the lower side comprises a high friction surface.

3. The folding step ladder of claim 1, wherein:
the platform comprises an upper side and an opposing lower side;
wherein the upper side comprises a hand hold member that extends upward from the platform.

4. The folding step ladder of claim 1, wherein:
the pair of spaced apart rails are parallel.

5. The folding step ladder of claim 1, wherein:
the platform comprises a pair of tubular sections that are hingedly connected to the pair of spaced apart rails.

6. The folding step ladder of claim 5, wherein:
the pair of tubular sections are telescoping.

7. The folding step ladder of claim 3, wherein the hand hold member is pivotally affixed to the upper side of the platform, such that the hand hold member is configured to selectively move between a raised position and a lowered position, wherein the hand hold member is perpendicular to the upper side when in the raised position, and wherein the hand hold member rests flush against the upper side when in the lowered position.

8. The folding step ladder of claim 1, wherein the stabilizing bar comprises a second elongated section affixed to the second end of the platform, wherein a first elongated section and a third elongated section are adjustably affixed to the second elongated section.

9. The folding step ladder of claim 8, wherein the first elongated section is configured to selectively extend from a first end of the second elongated section, and the third elongated section is configured to selectively extend from a second end of the second elongated section.

10. The folding step ladder of claim 1, wherein the platform comprises an upper side, the upper side being entirely flat and disposed on a single plane.

\* \* \* \* \*